Dec. 12, 1961 A. CALI 3,012,656

MACHINE FOR THE CASTING OF TYPES IN SLUGS TO BE USED AS HEADLINES

Filed April 28, 1959 14 Sheets-Sheet 1

INVENTOR
ATTILIO CALI
McGlew and Toren
ATTORNEYS

Dec. 12, 1961 A. CALÌ 3,012,656

MACHINE FOR THE CASTING OF TYPES IN SLUGS TO BE USED AS HEADLINES

Filed April 28, 1959 14 Sheets-Sheet 2

INVENTOR
ATTILIO CALÌ
McGlew and Toren
ATTORNEYS.

Dec. 12, 1961 A. CALÌ 3,012,656

MACHINE FOR THE CASTING OF TYPES IN SLUGS TO BE USED AS HEADLINES

Filed April 28, 1959 14 Sheets-Sheet 3

INVENTOR
ATTILIO CALÌ
McGlew and Toren
ATTORNEYS

INVENTOR:
ATTILIO CALÌ
McGlew and Toren
ATTORNEYS

INVENTOR
ATTILIO CALI
McGlew and Toren
ATTORNEYS

INVENTOR
ATTILIO CALÌ
McGlew and Toren
ATTORNEYS

INVENTOR
ATTILIO CALI'
McGlew and Toren
ATTORNEYS

INVENTOR:
ATTILIO CALI'
McGlew and Toren
ATTORNEYS

INVENTOR
ATTILIO CALÌ
McGlew and Toren
ATTORNEYS

INVENTOR:
ATTILIO CALI
McGlew and Toren
ATTORNEYS

INVENTOR
ATTILIO CALÌ
McGlew and Toren
ATTORNEYS

INVENTOR
ATTILIO CALI'
McGlew and Toren
ATTORNEYS

INVENTOR
ATTILIO CALÌ
McGlew and Toren
ATTORNEYS

INVENTOR
ATTILIO CALI
McGlew and Toren
ATTORNEYS

United States Patent Office 3,012,656

Patented Dec. 12, 1961

3,012,656

MACHINE FOR THE CASTING OF TYPES IN SLUGS TO BE USED AS HEADLINES

Attilio Calí, Turin, Italy, assignor to Neby Treu-Unternehmen Registriert, Vaduz, Liechtenstein Filed Apr. 28, 1959, Ser. No. 809,465
Claims priority, application Italy Apr. 30, 1958
3 Claims. (Cl. 199—47)

This invention relates to a machine for the casting of type in the form of slugs, to be used as head-lines. This type of machine is of the kind in which a so called "stick" is used, wherein the type-matrices are previously set in the combination as required to form the desired slug. In operation, the stick is placed on the machine, and brought into engagement with the casting mold. Molten type metal is then cast into said mold for the obtainment of a slug stereo. Finally the stick is withdrawn from the machine, and the single types are taken out by hand therefrom.

A more specific object of the invention resides in the provision of means for facilitating the casting of slugs, designed for the printing of head-lines only (that is exclusive of text).

As already well known, due to printing requirements, the setting of a page may be made with types of different sizes and styles.

Also known is the fact that the setting of head-lines carried out, in the most of cases, with single types, while the setting of text is done by means of automatic type-setting machines.

The automatic type-setting machines allow the casting of slugs of a length up to 12 cm. max., while on the hand-setting machines, slugs up to a length of about 9 cm. max. can be cast.

In the present conventional machines, slugs of a length up to 9 cm. only can be cast. If slugs with a length multiple of 9 cm. are required, a number of casting operations and operational cycles must be performed to fulfill the requirement.

One of the heaviest drawbacks of conventional casting machines is caused by the presence of a movable crucible, which results in loses of type metal, and in the necessity of frequent adjustments to ensure a tight seal of the injection nozzle of the mold and the matrices.

The movable crucible must perform two different motions, that is: firstly it is to be brought below the casting mold, which is adjusted in a horizontal plane; with the second motion, a pressure is exerted on the mold, to keep it tightly closed while the casting operation is performed. Then, after the casting operation, the crucible is moved away from the mold and brought to its rest position.

The single types, as presently used in the setting of head-lines, consist of small pieces of type metal, on the top of which is cast the letter or character. Such types are set in sticks, and then paged-up along with the stereos obtained by means of the above stated special machines.

The composite stereos must be inked at each printing cycle, to allow the types to be printed on the paper sheet. Continuously repeated inking and printing cycles will cause, according to time of operation and to number of printed copies, a wear of types and stereos. The wear of stereos is meaningless, since they are thereafter remelted in the crucible of the same machine. However, the single types, which are usually re-utilized, will lose their original height, and after having been mixed and combined, in a subsequent setting, with not-worn types of the same sizes or styles, shall give rise to fautly alignment, and consequently to poor printing.

The conventional head-line casting machine, both of the automatic, and hand-setting kinds, can be accurately defined on the basis of the max. sizes (height and width) of the types which are cast by them.

During the movement of the crucible near the mold, and return of the crucible to its rest position in conventional machines the following further drawbacks are encountered, in addition to drawbacks stated above:

(*a*) The adjustment devices, pertaining to movable crucible and to the assembly by which the tight contact (essential for the casting operation) is established, are subjected to distortions and oscillations, which result in a heavy prejudice of their performances.

(*b*) The whole structure is highly stressed and strained under the thrust exerted by the crucible.

(*c*) When the crucible is driven away from the mold, at the end of casting operation, more or less rough jerks are caused, due to cooling of type metal in the mold and ingots, and as function of type-metal temperature, with consequent prejudice of the adjustment.

In addition to above stated drawbacks, the need exists of a careful upkeep, servicing and tuning-up of the many adjustment devices with which the already known machines are provided.

By this invention, all the above stated drawbacks, and in particular those involved in the operation of movable crucible, are positively obviated.

All components of the machine according to the invention are contained in, and supported by a base of small overall size, much smaller than those of the machines heretofore known.

The whole sequence of operation is controlled by a shaft provided with a series of cams, through a lever assembly related to each cam.

The crucible is of the stationary type and is fitted on the top of the machine. The injection nozzle is fitted at the end of runner gate.

The tight contact of the mold with the matrices in front of injection nozzle, when a casting operation is performed, is obtained by means of a lock lever actuated by a cam, being the locking action transmitted by a screw-and-nut assembly interposed between said two components. The injection of molten metal is stopped by an electric interlock device when the different components are not tightly engaged with each other.

The invention will now be disclosed in the following description of an advantageous embodiment thereof, taken with the accompanying drawings, being both description and drawings given only as a not restrictive example of the range of the invention.

Figure 1:
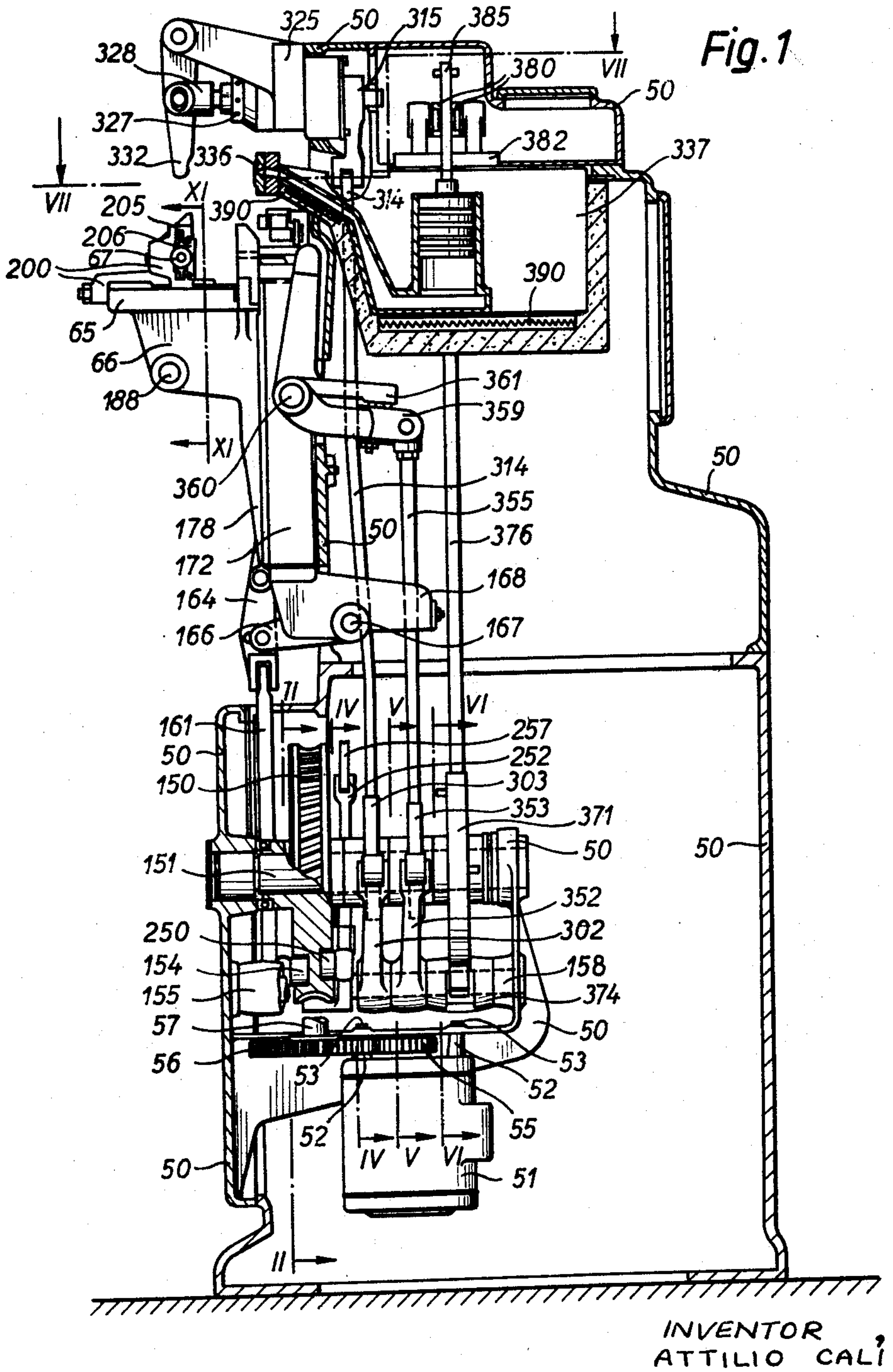
FIG. 1 is a side cross-sectional view taken along the line 1—1 of FIG. 7.

FIGS. 4, 5, 6 and 7, respectively, are cross-sectional views taken along the lines 4—4, 5—5, 6—6 and 7—7 of FIG. 1.

Figure 4:
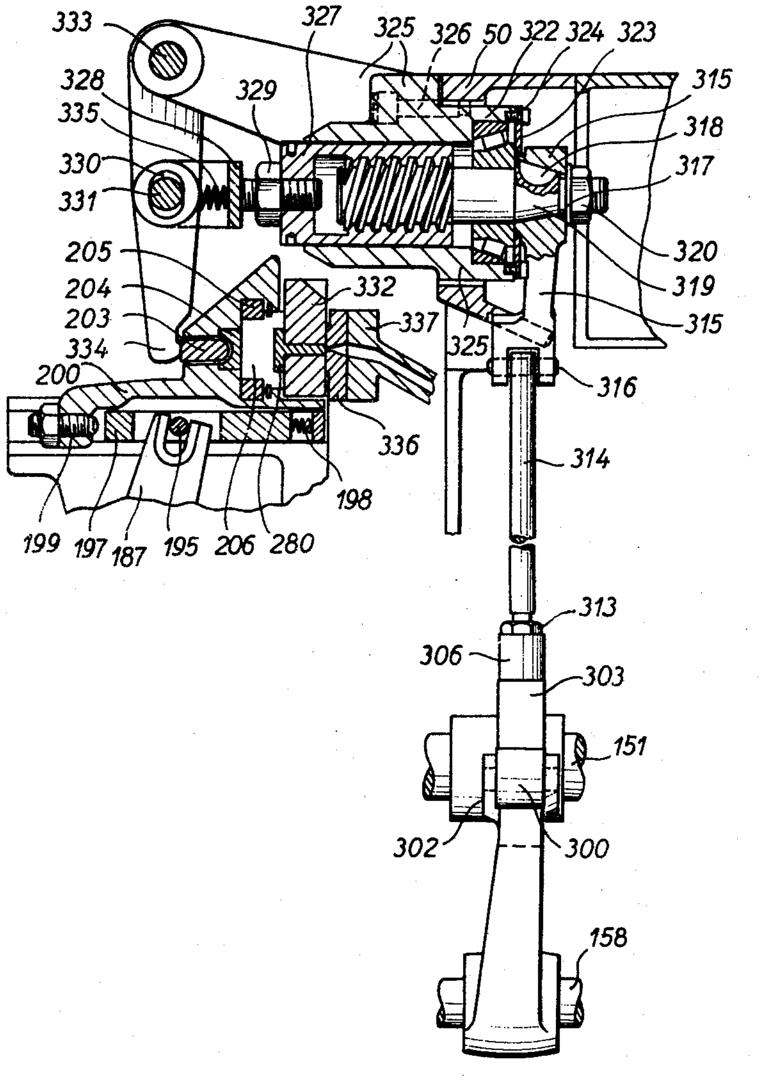
Figure 4A:
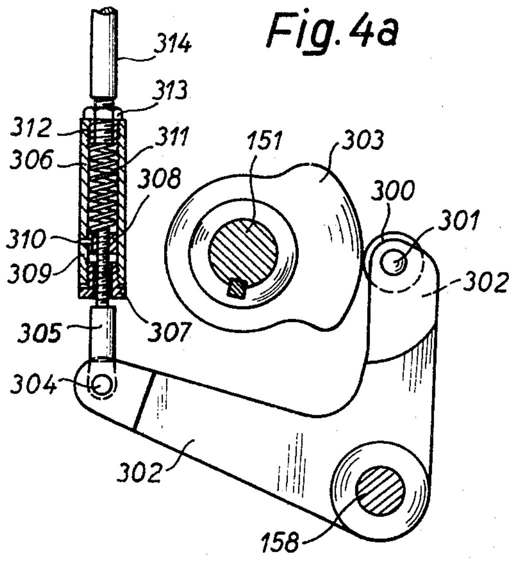

FIG. 4*a* is a fragmentary left side view of the lower portion of the mechanism indicated in FIG. 4.

Figures 5, 5A:
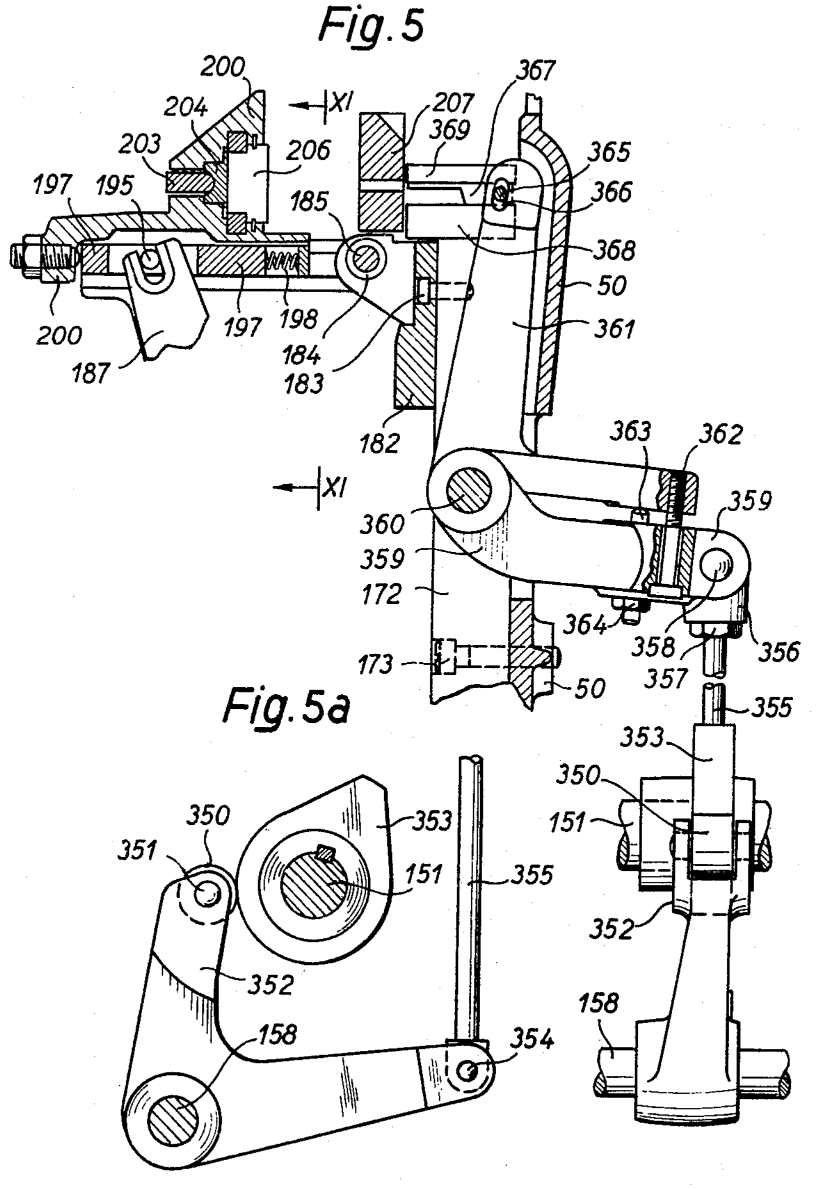

FIG. 5*a* is a right side view of the lower portion of the mechanism in FIG. 5.

Figures 9, 10:
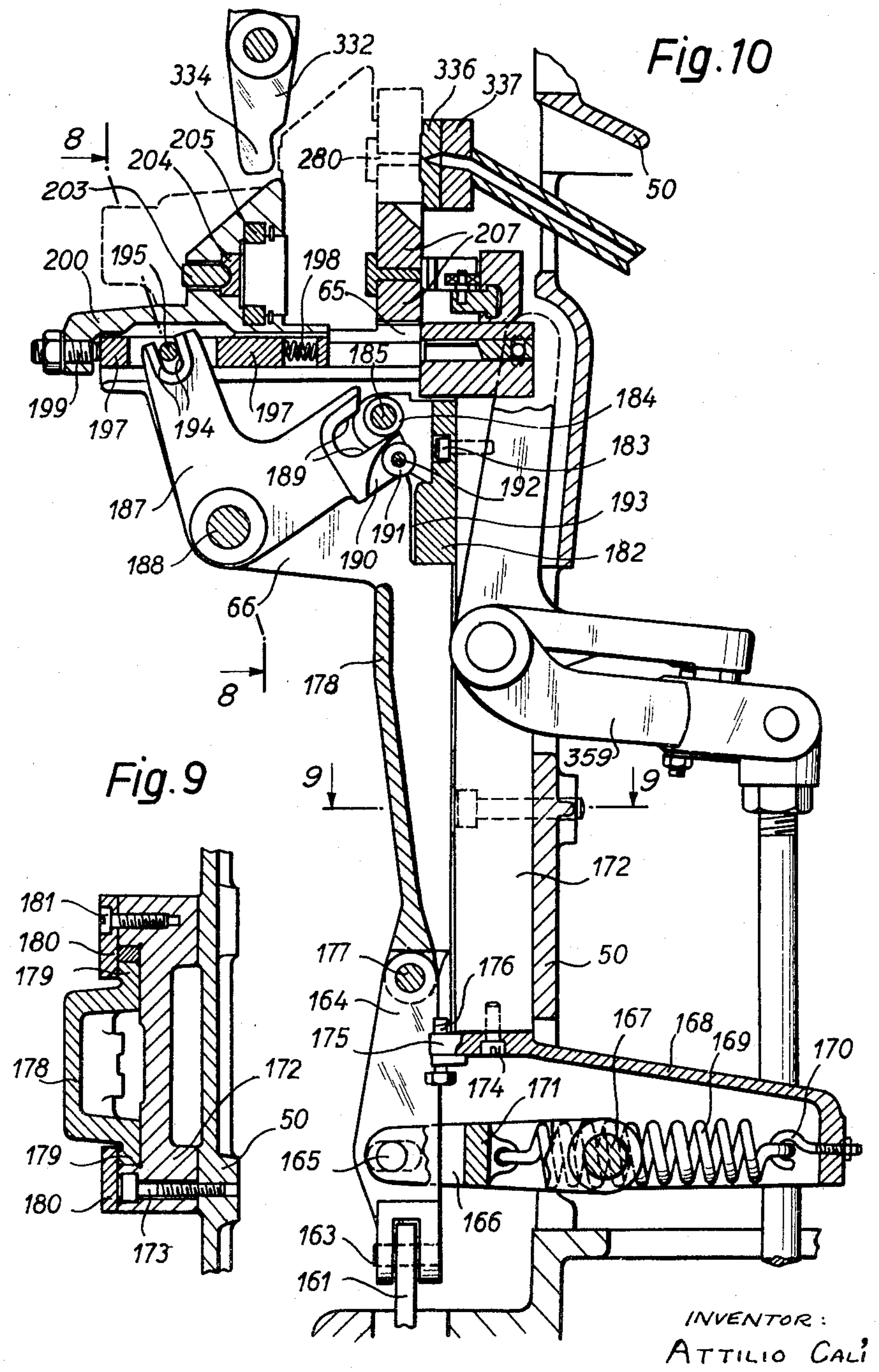
Figure 8:
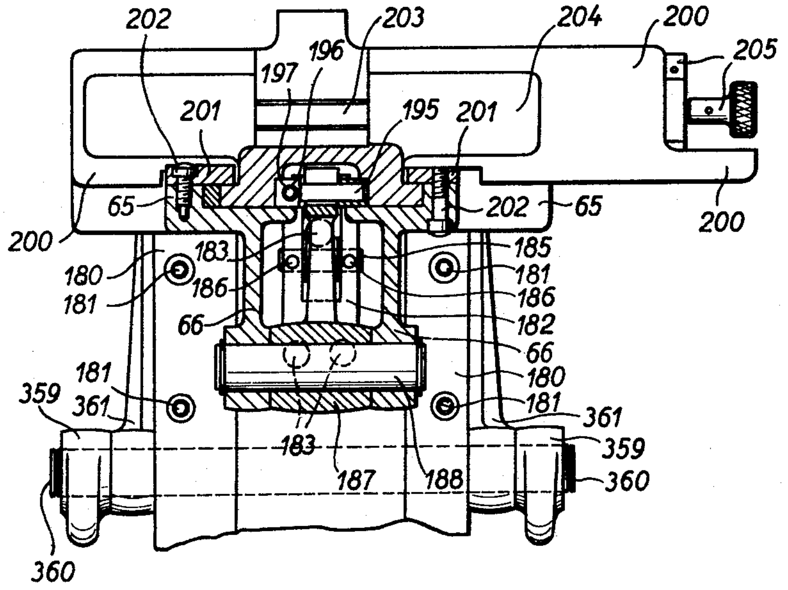

FIGS. 8 and 9 respectively are cross-sections taken along the lines 8—8 and 9—9 of FIG. 10.

Figure 7:
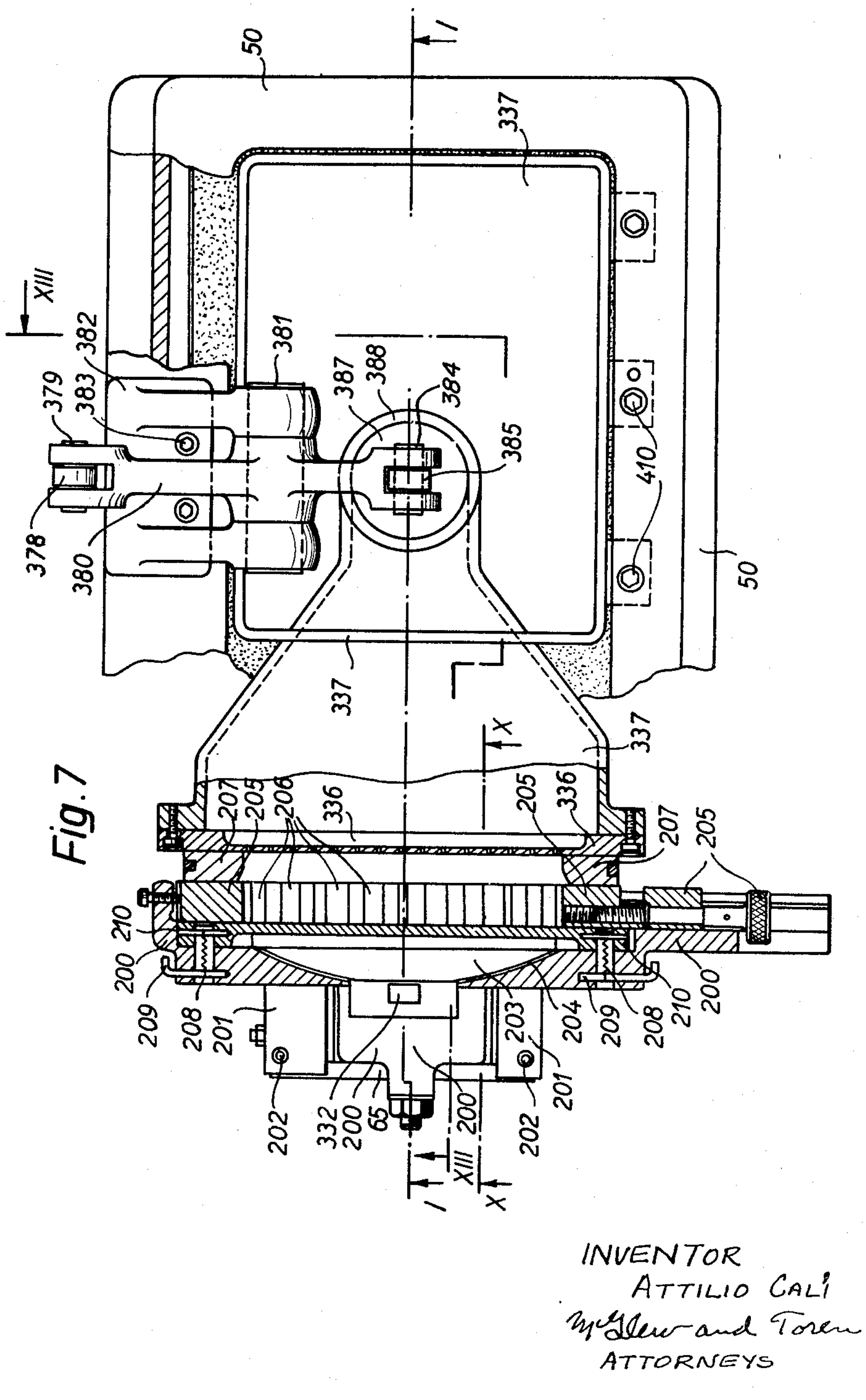

FIG. 10 is a cross-section taken along the line 10—10 of FIG. 7.

Figure 11:
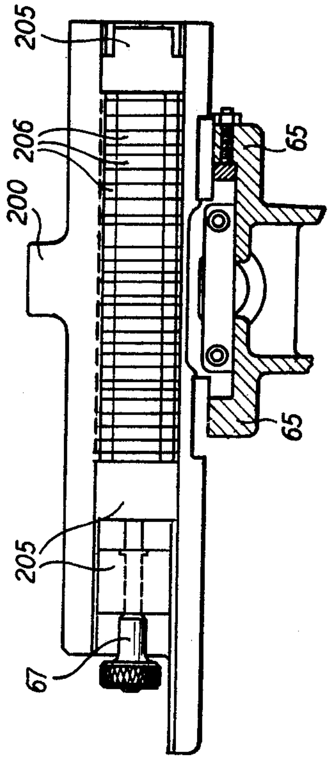

FIG. 11 is a cross-section taken along the line 11—11 of FIGURES 1 and 5.

Figure 6:
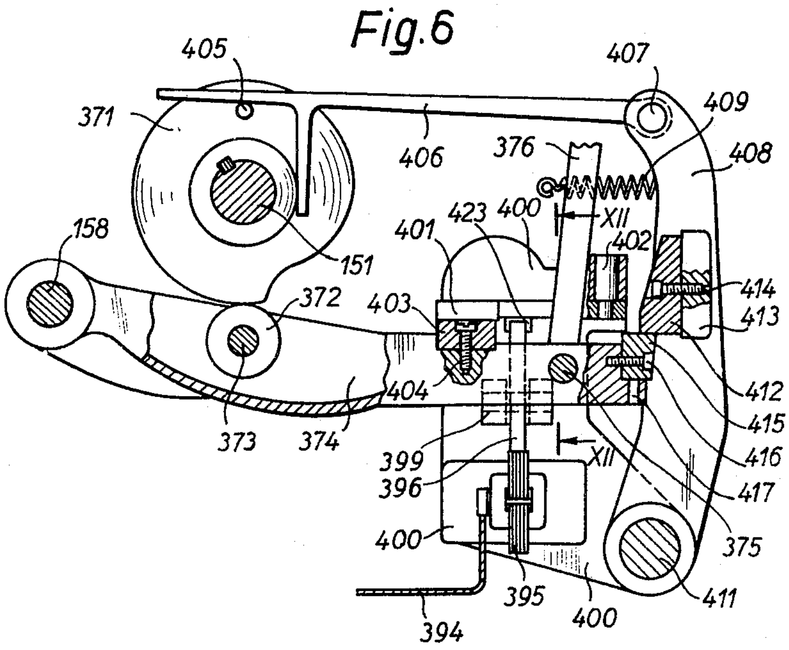
Figure 12:
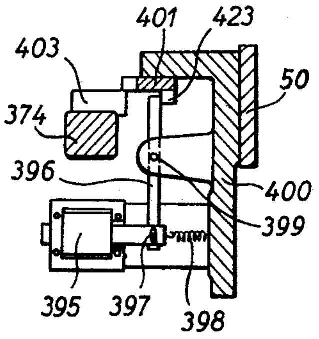

FIG. 12 is a cross-section taken along the line 12—12 of FIG. 6.

Figure 13:
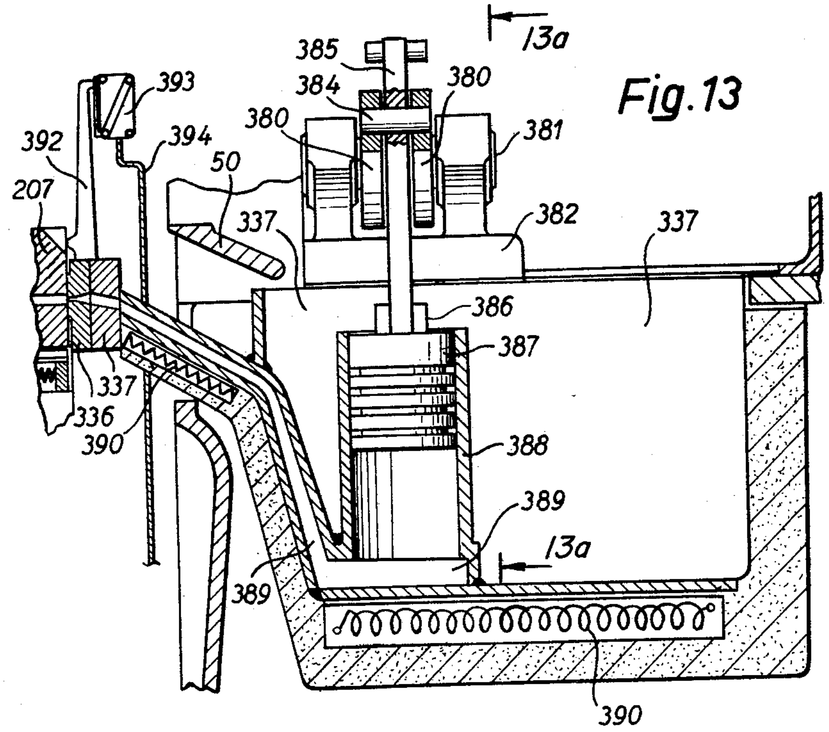

FIG. 13 is a cross-section taken along the line 13—13 of FIG. 7.

Figure 13A:
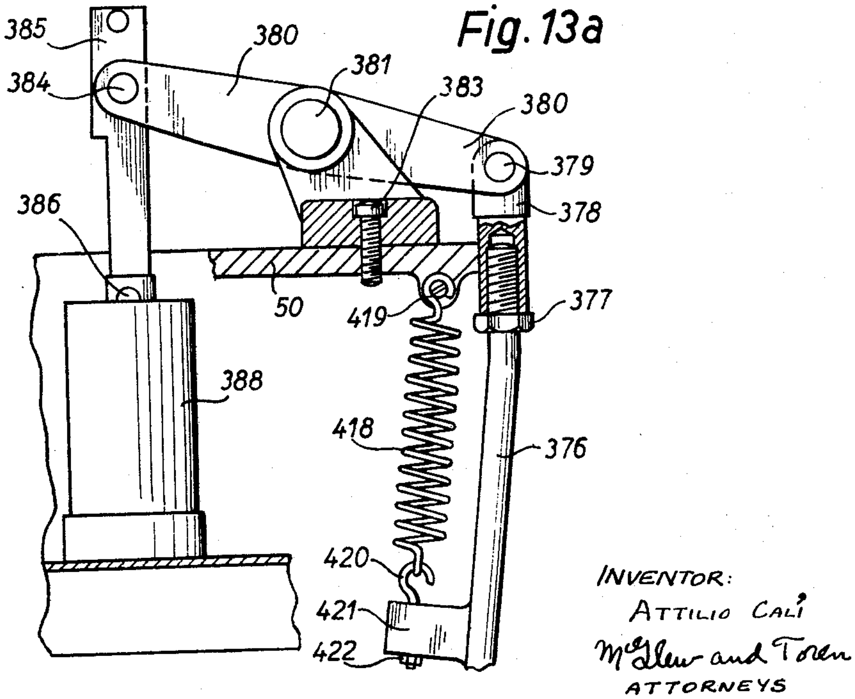

FIG. 13a is a section taken on line 13a—13a of FIG. 13.

Figure 3:
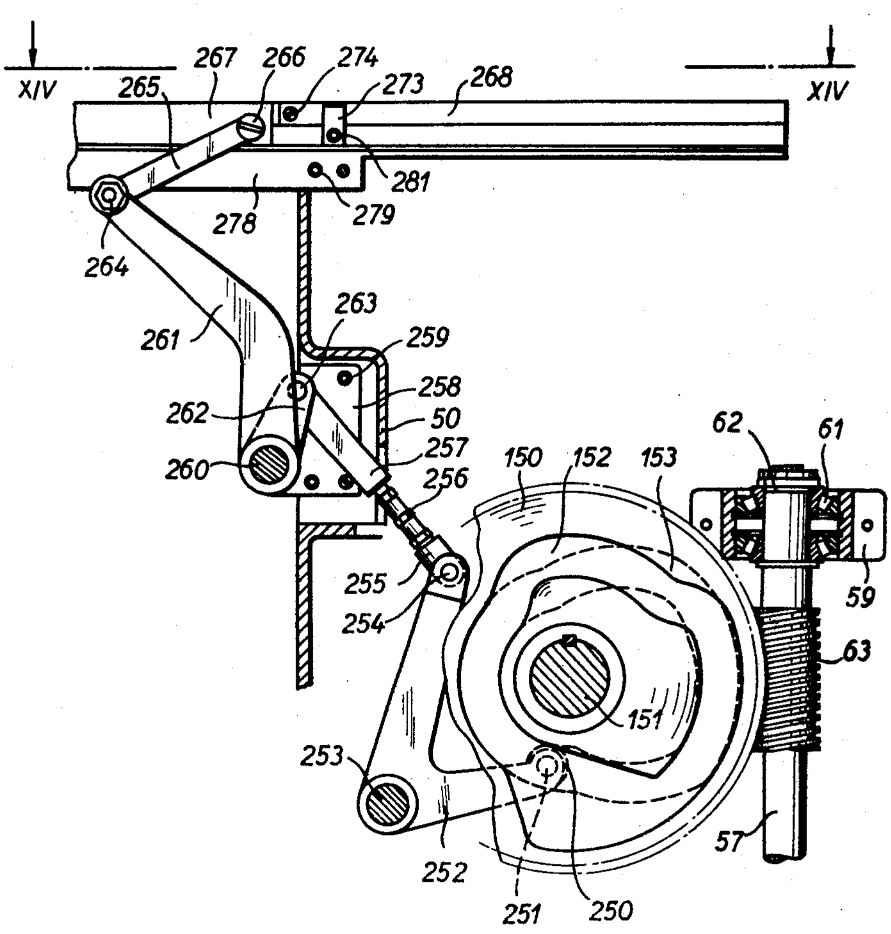
FIG. 3 is a cross-section of a cam assembly, taken along the line 2—2 of FIG. 1, being the upper lever assembly shown in a view from above.
Figure 14:
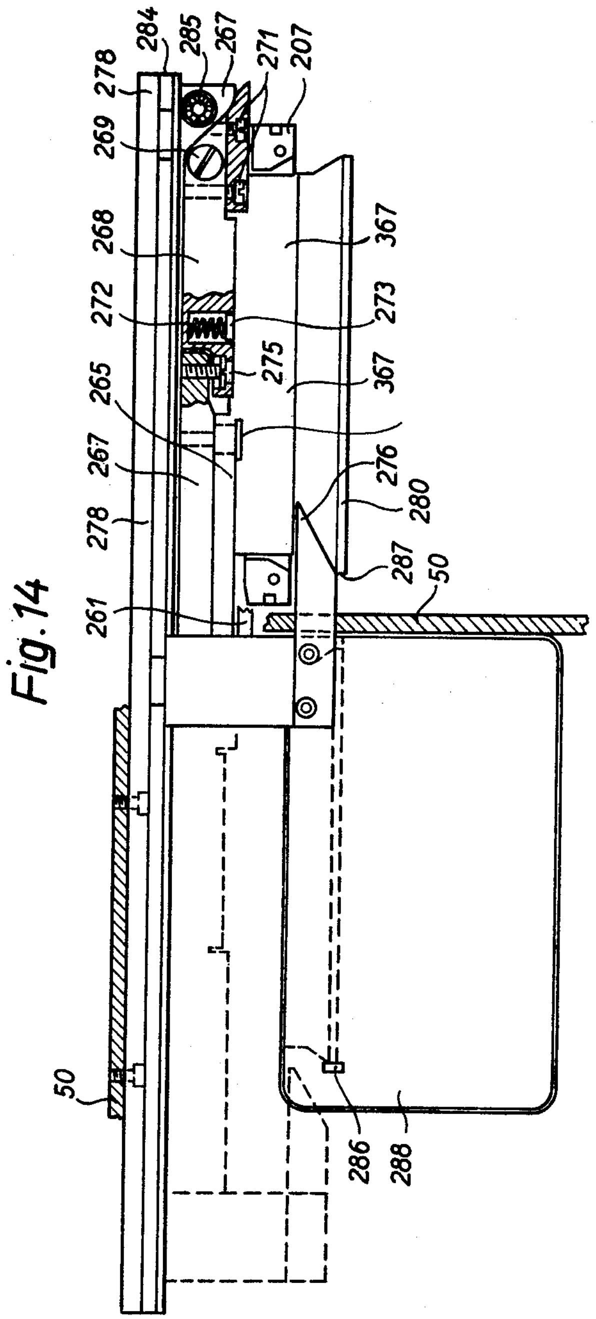

FIG. 14 is a view in the direction of the arrows 14—14 of FIG. 3, illustrating a number of components shown in a cross-sectional representation.

Figure 15:
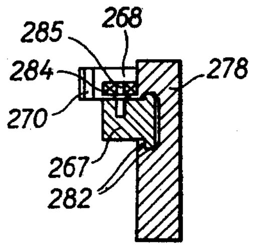
Figure 16:
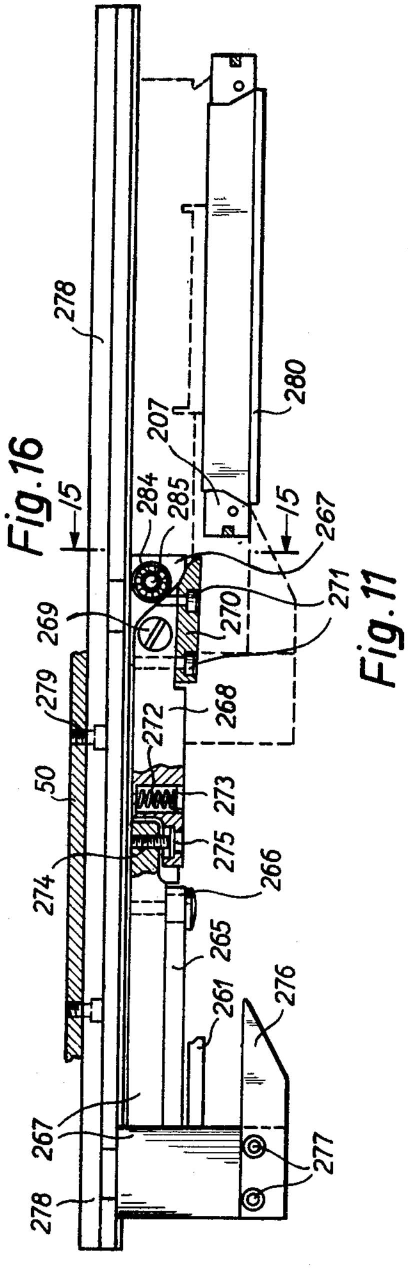

FIG. 15 is a cross-section taken along the line 15—15 of FIG. 16.

FIG. 16, similar to FIG. 14, is a view of the planer in its rest position.

Figure 17:
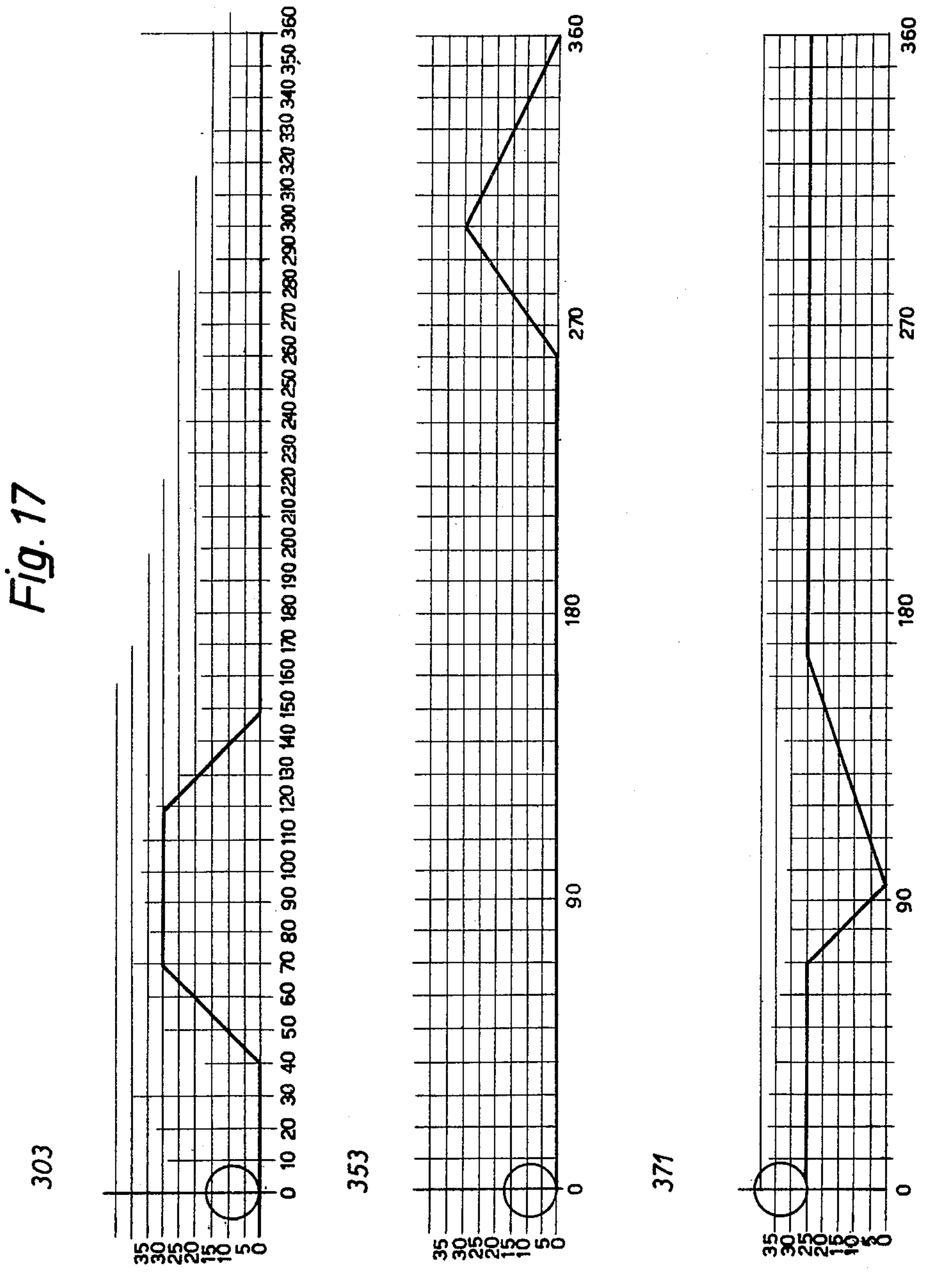

FIG. 17 diagrammatically shows the cam profiles.

Figure 17A:
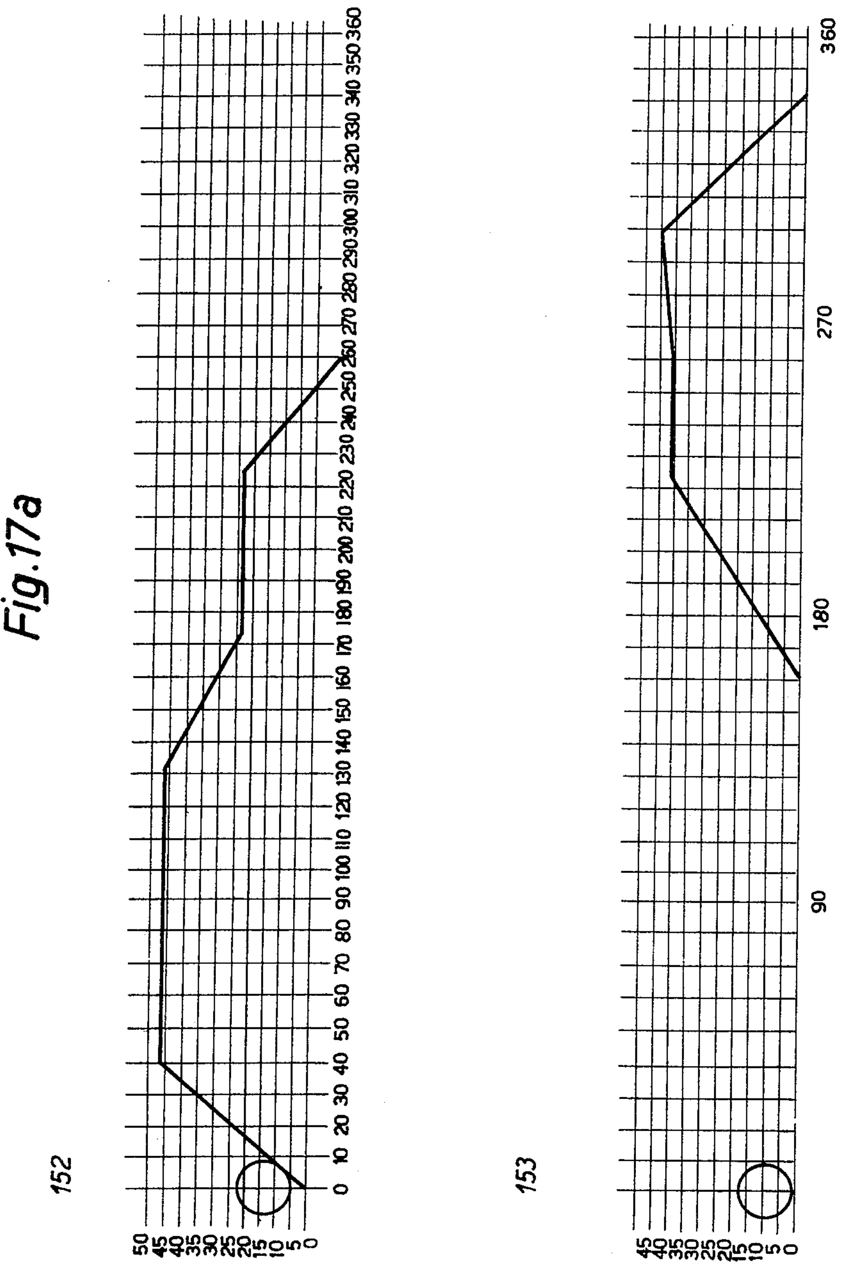

FIG. 17a is a continuation of the same profiles of FIG. 17.

The machine comprises a frame 50 (see FIGURES 1, 2 to 16), in which all machine components are contained and supported.

An electric motor 51 (see FIGURES 1 and 2) is vertically fitted in the lower section of the frame. More precisely, said motor 51 is fastened by means of studs 52 (see FIGURES 1 and 2) and bolts 53, to a bracket 50' supported by the frame 50. A pinion 55, keyed on the shaft 54 (see FIG. 2) of motor, meshes with a gear 56, keyed on a shaft 57, laid on supports 58 and 59 (see FIG. 2) secured to frame 20; said supports 58 and 59 are respectively fitted with the roller bearings 60 and 61, held by the threaded sleeves 62.

A worm 63, cut in the middle section of shaft 57, meshes with a worm wheel 150, shaped as a double cam (as described in more detail later), and keyed on the shaft 151, on which further cams are also keyed (as described later).

*Lifting device for the matric carrying frame*

Figure 2:
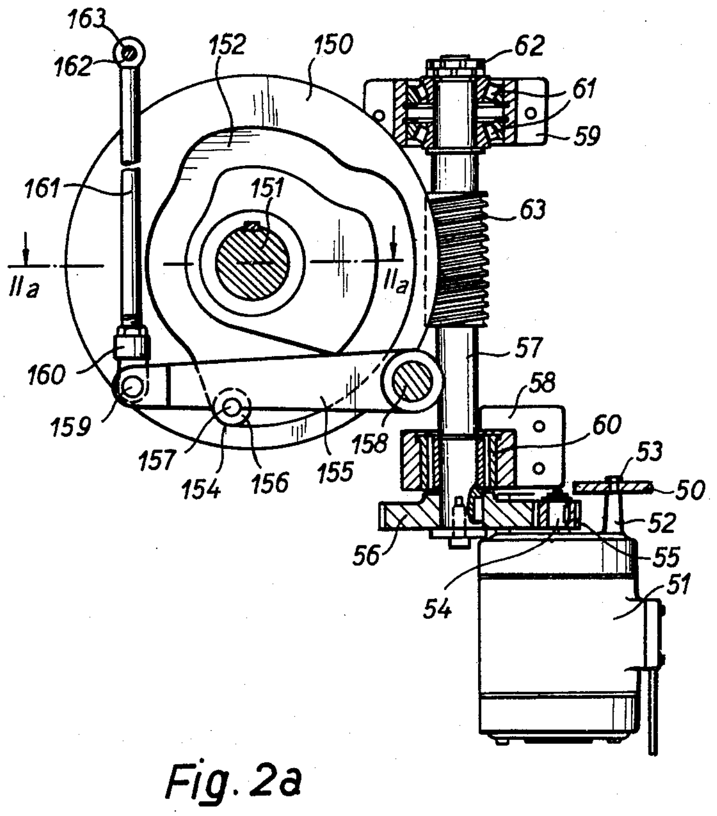
FIG. 2 is a cross-section taken along the line 2—2 of FIG. 1.
Figure 2A:
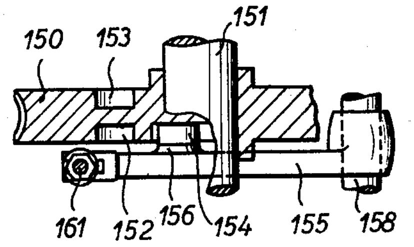
FIG. 2A is a cross-section taken along the line A—A of FIG. 2.

Two peculiarly shaped grooves 152 and 153 are cut on one side of worm wheel 150 (see FIG. 2A). Such grooves act as cam tracks, which profile is diagrammatically shown in the FIG. 7. A cam-follower 154, engaged in the groove 152, is fitted on a pin 157, secured to the middle section of a lever 155 (see FIGURES 2 and 2A) set on the pivot 158 supported by the frame 50 of the machine. The opposite end of lever 155 is fork-shaped, to accommodate a pin 159 for the adjustable head 160 of a connecting rod 161, which opposite end is formed with an eye 162, wherein the pin 163 is fitted (see FIGURES 2 and 10), being said connecting rod 161 connected by latter pin with the fork-shaped end of a rod 164. One fork-shaped end of a lever 166 is connected by the pin 165 (see FIG. 10) with the middle portion of a rod 164. The opposite end of the lever 166 is also fork-shaped, to accommodate two pivots 167, secured to a bracket 168, the bracket 168 being secured by means of screws 174, to the lower end of a guide-plate 172, fastened to the machine frame 50 by means of the screws 173.

A spring 169 is anchored by one of its ends to a hook 170 (see FIG. 10) fitted in a hole of the bracket 168, while the opposite end of the spring 169 is attached to a perforated lug 171 with which the lever 166 is fitted. A micrometer screw 176 (see FIG. 10) is screwed in a perforated lug 175 fitted on the end of bracket 168, and is designed to act as a limit stop for the travel of a prismatic slide 178, slidingly fitted on the guide-plate 172.

The slide 178 (see FIG. 9) is formed with two wings 179 (see FIG. 9) which on one side slide on the guides of plate 172, whilst the opposite side is held by the plates 180, which can be tightened with the aid of the screws 181. The rod 164 is hinged by means of a pin 177 in a fork formed on the lower end of the slide 178; a bracket 65, fitted on top of latter slide (see FIGS. 1 to 8 and 10) is formed with ribs 66, between which the pivot 188 of a cranked lever 187 is held; a roller 184, engaged in one fork-shaped end 189 of latter lever, is fitted on a pin 185, secured by means of screws 186 (see FIG. 8) to support 182 which in turn is secured to guide-plate by means of the screws 183. A cam follower 191 co-operating with a long cam track 193 formed on the foreside of support 182, is engaged within a groove 190, formed on the end of lever 187, and is held therein by a pin 192 secured to said lever. The opposite end of cranked lever 187 is formed with a fork 194 (see FIG. 10) to accommodate the pin 195 (see also FIGURES 4 and 5) which is secured by means of the screws 196 (see FIG. 9) to a slipper 197, slidingly fitted in a suitable seat, formed inside of head 200. Said slipper 197 is forced against a set-screw 199 by the action exerted thereon by a spring 198, held in an abutment formed on head 200. The casting mold 207 is secured on the bracket 65 by means of screws (not shown). The head 200 is slidingly fitted, by means of the prismatic guides 200' secured to lower section thereof, on seats formed on top of bracket 65, and with which co-operate the gibs 201, secured to said bracket 65 by means of screws 202, being said gibs designed to have said guide held and guided, during its rectilinear, reciprocal motion.

A pusher 203 (see FIGURES 7 and 10) designed to cooperate with the pressure plate 204, is seated in an opening formed on the upper section of head 200. Said pressure plate is kept forced against the bottom of its seat, formed in the head 200, by the action of two springs 208 (see FIG. 7), which ends are held by two pins 209 and 210, respectively fitted on head 200 and on said pressure plate 204.

The grooves 205', formed also on top of head 200 in a direction orthogonal to sliding surface thereof, are designed to removably hold a frame 205, wherein the types 206 are set, and that can be inserted and withdrawn through an opening formed on one side of head 200.

*Planing and withdrawal of slug*

A cam-follwer 250 (see FIG. 3), engaged in the groove 153 (see FIGURES 2A and 3) is fitted by means of a pin 251 on one end of a cranked lever 252, pivoted by means of a pivot 253 to frame 50; the opposite end of cranked lever 252 is fork-shaped to accommodate, by means of a pin 254, the end 255 of a connecting rod 257, which length can be adjusted by means of a tie-rod 256; the opposite end of same connecting rod is linked, by means of a pin 263, with one arm 262 of a lever 261. Latter lever is pivoted on a pivot 260, fitted on a support 258 secured to frame 50. Said lever 261 is connected, by means of a pin 264 (see FIG. 3) with a connecting rod 265, that is kept engaged by a screw 266 (see FIGURES 3, 14 and 16) to a slide 267 running on guides 282 (see FIG. 15) formed on a bar 278 secured by means of screws 279 (see FIG. 16) to frame 50. A ball bearing 284, that runs on the bar 278, is held by a pin 285, secured on the right end of slide 267 (see FIGURES 14 and 15). A plane bit 270, secured by means of screws 271 to a supporting lever 268 (see FIGURES 14 and 16), is held in position, while allowed to perform very small swinging motions, by a threaded pin 269, secured to slide 267. Said supporting lever is swung, in clockwise direction, by a spring 272 seated in a hole formed in same lever, and held by a plate 273, secured to slide 267. The position of cutting edge of plane bit 270 is adjusted by means of a micrometer screw 274, which head is seated in a seat 275, formed on supoprting lever 268. Pincers 276 are secured by means of screws 277 on the opposite end of slide 267.

*Locking device for the matrices*

A cam-follower 300 is engaged with the cam track (see FIG. 17) of a cam 303, keyed on the shaft 151 (see FIGURES 1, 2 and 4). Said cam-follower is journalled on a pin 301, secured to one end of a cranked lever 302, which pivot 158 is fastened to frame 50. The opposite end of said lever 302 is connected, by means of a pin 304, with the tie-rod 305 of a damper.

Said damper consists of a tubular body 306, having its lower end closed by a threaded ring 307. The tie-rod 305, slidingly fitted in the bore of said ring, is provided, at its free end, with a second threaded ring 308, formed with a groove, in which a pin 310, secured to tubular body 306, is engaged. A spring 311 is fitted inside of body 306, and is held by the second threaded ring 308 and by a bush 312, into which the upper rod 314 is threaded and locked by the nut 313. The top end of said rod is connected, by means of a pin 316, with a fork, formed on one end of an arm 315, that is secured on the shaft 319 by means of a key 318 (see FIG. 4) and of nut 320.

The shaft 319 is laid in a bearing 322, held in its axial position by a disc 323, secured to a tube 325, which in turn is fastened to frame 50 by means of the screws 326 (see FIG. 4).

A gudgeon 327 is seated in the bore of tube 325. Said gudgeon is axially bored and threaded to accommodate a double screw threaded rod 321, to which the shaft 319 is secured (see FIG. 4). A fork 328, secured to the outside of gudgeon 327, is designed to accommodate in pin 331, engaged in an opening 330 formed on the middle section of a lever 332, pivoted, by means of a pivot 333, to a bracket 325 (FIGURES 1 and 4), secured to frame 50.

A ball-shaped head 334 (see FIG. 4) formed on the lower end of a lever 332, is designed to act on the pusher 203, already described in connection with the "Lifting device for matrice holding frame."

*Device for knocking the line or slug out of the mold*

A cam-follower 350 is engaged with the cam track of a cam 353, keyed on the shaft 151 (see FIGURES 1, 2, 4 and 5). Said cam-follower is journalled on a pin 351, secured on one end of a crank lever 352 pivoted to a pivot 358 (see FIGURES 1 and 5) secured to the frame 50 of machine. Said lever is connected by means of a pin 354 with a tie-rod 355, which is linked, through a suitable head formed on its upper end, and by means of a pin 358, with the arms 359 (see also FIG. 8), keyed on a shaft 360, which is supported by the brackets 172. The lower ends of cranked levers 361, pivoted also on latter shaft, are designed to co-operate with micrometer screws 363 fitted on the arms 359 (see FIG. 5) and locked by the lock-nut 364 (FIG. 5). Said arms 359 show also holes, through which are fitted the screws 362, screwed on the two levers 361 in order to keep same levers 361 engaged against their micrometer screws 363. The pins 366 are slidingly fitted in slots 365 cut on the upper ends of levers 361. Said pins (see also FIG. 5) are secured to a bar 367 acting as slug-pusher (see FIGURES 5 and 14) and slidingly fitted in suitable slots cut on a lower block 368, and on an upper plate 369.

*Device for the injection of molten type metal into the mold*

A cam-follower 372 is engaged with the cam-track of a cam 371 (see FIGURES 1 to 6 and 17) keyed on the shaft 151. Said cam-follower is journalled on a pin 373 secured to the middle portion of a lever 374 pivoted to frame 50 by means of a pin 158. A ratchet tooth or peg 415 is held by screws 416 on the opposite end of said lever 374, wherein it can be adjusted by screw means 417. Said tooth is designed to co-operate with a counter-tooth 412, secured by means of screws 414 to a bracket 413 (see FIG. 6), fitted on the middle section of lever 408. Latter lever 408 is pivoted, at its lower end, to a pivot 411, secured to a plate 400 (see also FIG. 12) which on its turn is fastened to frame 50.

A counter-lever 406 is hinged, by means of a hinge-pin 407, on the upper end of lever 408. One end of said counter-lever is square-bent, and is designed to co-operate with a pin 405 (FIG. 6) secured in a suitable position on the side of cam 371. Said lever 408 tends to return in its left-hand rest position under the action of a spring 406 (see FIG. 6).

A rod 376 is hinged to a hinge-pin 375, fitted near the tooth 415 on the lever 374 (see also FIGURES 1, 6, and 13). Said rod extends vertically upwards, and is connected by means of an adjustable tube 378 and a pin 379, with a rocker lever 380. Latter lever is pivoted to a pivot 381 (see FIGURES 7 and 13) supported by a bracket 382 (see FIGURES 1, 7 and 13) that on its turn is secured to frame 50 of the machine.

The opposite end of lever 380 is connected, by means of a pin 384, with a connecting rod 385 which is on turn connected, with the aid of a universal joint 386, with a piston 387, slidingly fitted in a cylinder 388, secured in the inside of a crucible 337, that is fastened to frame 50 by means of the screws 410.

The bottom of said cylinder 388 is connected with a siphon-shaped gate 389. A nozzle 336, fitted on the outer end of said gate, serves to inject the molten type metal, under the action of piston 387, into the mold 207. The type metal contained in the crucible, is kept in its molten state by electric heating resistances 390.

The middle portion of rod 376 is formed with a perforated tappet 421. One end of a spring 418 (FIG. 13) is engaged by a hook 420 with said tappet, while the opposite end of same spring is anchored, by means of a pin 419, to machine frame 50. The action exerted by same spring causes the molten type metal to be injected into the mold 207.

*Melting safety device*

The mold 207 is engaged against the lower end of a lever 392 (FIG. 13) pivoted on the crucible 337, while a microswitch 393 is acted upon by the upper end of same lever, whereby, when the mold 207 is forced against the injection nozzle 336, an electric circuit is closed by which, through a cable 394 (see FIGURES 6, 12 and 13) an electromagnet 395 is energized. Said electromagnet is fitted on a bracket 400, secured to frame 50.

The movable core 397 of the electromagnet 395 is kept under the action of a spring 398, secured to the plate 400, and that is connected with a rocker lever 396 hinged, by means of a hinge pin 399, to said bracket 400.

The upper end of rocker lever 396 is engaged with a stop 423 filled on the middle portion of a lever 401, which is hinged at one end on a hinge pin secured on the bracket 400, while its opposite end is engaged with a safety tooth 403 secured on the lever 374, by means of a screw 404 (FIG. 6).

*Operation of the machine*

After having established the style and sizes of printing types to be used for the setting of line or slug, the matrices 206 are hand-set and justified by the operator in a so called "stick" in the sequence as needed for the required line or slug.

In case the length of line or slug is smaller than the length of a form for 40 lines or slugs (ems), (equal to about 18 cm.) spaces and quads are set by the operator in said form, to complete the length of 40 lines or slugs (ems), allowing a tolerance of $\pm 2$ "ems," which is then made-up for, by acting on micrometer screw 67, that serves also to screw-up all matrices tightly together, thereby obtaining a compact unit.

Then the matrice carrying frame or form 205, prepared in the above described manner, is brought into the head 200 of the machine (see FIGURES 1 to 10, and 11), care being taken to have said frame accurately located against the stop.

From this time onward, the machine is ready to start its operational cycle, which is carried out in an automatic manner by depressing a starting push-button. Thus, the series of operations is started by which a printing line or slug is obtained.

To better explain the sequence of different steps, reference will be made to diagrams shown in FIGURE 17, which represent all driving elements of machine, consisting of cams 153, 152, 371, 353 and 303. The angular motions, given as sexagesimal degrees, are carried on the abscissae of such diagrams. During the first 40 degrees, the slide 178 is lifted by the cam 152 (see FIGURES 1, 2, 2A, and 17) from its rest position, which is below the level of its stroke and wherein the matric frame or "form" 205 has been fitted thereon. The slide is thus lifted up to its casting position, that is in front of injection nozzle 336, in such a manner that the mold 207 and the matrices 206 be near one another and on the same axis, as it can be clearly seen in the portion of FIG. 10 shown with dashed lines.

However, the mold 207 is vertically lifted, since it is secured to slide 178, and it is brought to the fore of said injection nozzle 336. While the slide 178 is being lifted, the fork-shaped end 189 of lever 187 is brought into engagement with the roller 184, journalled to base 172. As a consequence thereof, the lever 187 is swung in clockwise direction, whereby the head 200 (see FIG. 10) is shifted with a forward rectilinear motion from left to right (see FIG. 10) and the matrices carried on said head are brought nearer to mold 207 before that the position of maximum height has been attained by same mold.

In the last portion of lifting stroke, the shifting motion imparted by the lever 187 is offset by the slider 197, connected thereto by the pin 195, and by which the compensating springs 198 are compressed.

The above stated sequence of motions is called for by the necessity to have the pusher 203 (see FIG. 10) brought in the position nearest to spherical head 334 of lever 332. The action exerted by said lever will be described later on.

The lever systems pertaining to cams 153, 303, 353, and 371, are not acted upon by same cams during said first 40 degrees. In the further angular motion, between about 40 degrees and 70 degrees, no motion is imparted by the cam 172 to slide assembly 178, and the lever systems are left inoperative by the cams 153, 353, and 371. The cam 303, on the contrary, will reach its position of maximum lift (see FIGURES 4 and 17) thereby swinging the lever 315; thus the screw 321 is turned, and the sleeve 327 is axially moved from left to right; this results in the head 334 of lever 332 being engaged with the pusher 203, to bring the matrices 206 tightly against the mold 207, whereupon both matrices and mold are, on turn, brought against the injection nozzle 336. The rest position of lever 332 is shown in dashed lines in the FIG. 4, while the locking position, taken by same lever is shown in full lines in same figure.

Referring again to cam 152 (FIG. 17), in the further angular motion, from about 70 degrees and 95 degrees, no motion is imparted by same cam, as well as by the cams 153, 303, and 353, to related lever systems.

However, from 70 degrees onward, the cam 371 will take an angular position such that the cam-follower 372 journalled on lever 374 is brought into engagement with the lowest section of track of said cam. Nevertheless, no motion is imparted to lever 374 since the tooth 415, fitted on the end thereof, is kept engaged by the counter-tooth 412, fitted on the lever 408.

After the cam 371 has been turned by about 95 degrees the lower arm of crank lever 406, pivoted to lever 408, is moved from left to right by the pin 405. As a result thereof, latter lever 408 is swung in clockwise direction, thereby disengaging the tooth 412 from the counter-tooth 415, and allowing the instantaneous lifting of lever 374. Consequently the piston 387 (see FIG. 3), under the action of its return spring 418, will quickly force the amount of molten metal, as required for the casting of printing line or slug, into the mold 207.

The injection of molten metal must be performed as quickly as possible, since it is essential that the matrices and mold 207 be filled with the utmost speed. This can be obtained by suitably adjusting the tension of spring 418.

Prior to above described injection step, the safety device must be released.

Such device is of the electric interlock type, and is brought into operation when the microswitch 393 is closed by the lever 392 (see FIG. 13) driven by the mold 207.

Thus, the electromagnet 395 is energized, and its movable core causes a swinging of rocker lever 396 (see FIGURES 6 and 12), which on its turn causes the lever 401 to be swung from left to right (see FIG. 12) by an amount sufficient to bring itself out of engagement with the tooth 403 fitted on the lever 374. Thus the lever 374, thereby released from lever 401, is allowed to return under the pull of spring 418, and the molten metal is injected by the piston 387 into the mold 207.

The position taken by the above considered components due to release of safety device, is shown with dotted lines in the FIG. 12.

During the further angular motion, from about 95 degrees up to 120 degrees, the following controls are imparted: no drive is imparted by the cams 152, 153 and 353 to related lever systems; however the cam 371 (see FIG. 6), due to the profile of its track, and through the action of cam-follower 372, will bring the lever 374 back in its rest position; the final position attained by latter lever at 120 degrees is shown in solid lines in the FIG. 6.

Considering now the angular motion from about 120 degrees and 135 degrees, the cams 152, 153, and 353 show a constant in said range. However, the cam 371 will continue to bring the lever 374 back in its rest position (see FIG. 6), while the release of lever 332 is started by the cam 303 (see FIG. 4).

In the further angular motion from about 135 degrees, up to 150 degrees, the cam 152 will start the downward stroke of bracket 168, along with the components supported thereon, to bring the mold 207 in the planing position, as shown with solid lines in the FIG. 10.

At the same time, the lever 332 is driven by the cam 303 away from pusher 203 (see FIG. 4), being the end position taken by same lever shown with dashed lines in the FIG. 4. In the meantime, the cam 371 will continue to bring the lever 374 back in its rest position, while no drive is imparted by the cams 153 and 353 to related lever systems.

While the above considered cam group is being turned from about 150 degrees and 160 degrees, the cams 152 and 371 will continue in their operations, as stated above, while no drive is imparted by the cams 153, 303, and 533 to related lever systems.

Taking now into consideration the further angular motion from about 160 degrees and 165 degrees, the cams 152 and 371 will continue in driving the related components, as already stated, while no drive is imparted by the cams 303 and 353. However, a rectilinear feed motion is imparted by the cam 153, through the lever systems 261 and 265, to slide 267 (see FIGURES 3, 14 and 16), whereby the plane bit 270 is brought against the cast slug 289 to start the planing and burring operation thereon.

During the subsequent turning of said cam group from about 165 degrees to 175 degrees, the hereinafter stated drives are imparted: the downward stroke of bracket 178 is brought to its end by the cam 152, thereby bringing the mold 207 (see FIG. 10) in the planing position. Upon reaching the position of about 165 degrees by the cam 371, the lever 374 (see FIG. 6) will attain its lowest position, that is its rest position, and no more drive is imparted by it, while the cam 153 continues to drive the slide 267, thereby going on with the planing operation. Finally, no drive is imparted by the cams 303 and 353 to related lever systems.

In the further angular motion from about 175 degrees up to 225 degrees, no drive is imparted by the cams 152, 303, 353, and 371 to related lever systems, while the planing operation is completed by the cam 153, and at the end of said operation the planing bit 270 is brought back in its rest position, as shown with dashed lines in the FIG. 16.

While the considered cam group is being turned from about 225 degrees and 260 degrees, the mold 207, along with the cast slug (see FIG. 10), is brought by the cam 152 from the planing position down in its lowest or rest position, to knock the slug 280 out of the mold. No further drive is imparted by the cams 153, 303, 373, and 371.

While the cam group is being turned from about 260 degrees up to 300 degrees, no drive is imparted by the cams 153, 303, and 371; the pincers 276 are brought forward by the cam 153 (see FIGURES 14 and 16) and at the same time the knockout device 367 (see FIGURES 5 and 14) is operated by the cam 353, to have the slug 280 knocked out of mold 207. The forward motion of pincers 276 and the knocking of slug out of mold must take place at the same time, since the slug shall be gripped by the pincers as soon as it is ejected from the mold; such step is clearly shown in solid lines in the FIG. 14, wherein the slug 280 is shown already gripped by the pincers.

In the further angular motion from about 300 degrees up to 345 degrees, no drive is imparted by the cams 152, 303, and 371, while the planer bit 270 and the pincers 276 are brought by the cam 153 back in their rest position (see FIGURES 14 and 16), and the finished slug 280, by knocking against a stop 286, is withdrawn from the pincers 276, and is collected in an underlying tray 288.

The positions taken by the side and the slug, while this latter is being collected into the tray 288, are shown with dashed lines. After said operation, the slug pusher 367 is brought back in its rest position by the cam 353, while the cam group is being turned from 345 degrees to 360 degrees.

In the course of latter angular motion (15 degrees), no drive is imparted by the other cams 153, 152, 303, and 371.

Obviously, many modifications and variations of the present invention are possible in the light of the above teachings. Therefore, it is to be understood that the invention is not limited in its application to the details specifically described or illustrated, and that, within the scope of the appended claims, it may be carried into practice otherwise than as specifically described or illustrated.

I claim:

1. In a machine for casting of types in slugs to be used as headlines, a frame, a stationary metal pot supported in the upper part of said frame, a mouth-piece communicating with said pot and arranged at the front of said frame, means for feeding molten metal from said metal pot to said mouth-piece, a vertical guide fixedly secured to said frame and arranged below said mouth-piece at the front of said frame, a bracket slidably supported by said guide and projecting from the front of said frame, a slotted mold carried by said bracket at its end near the front of said frame, a head including a receptacle for inserting a hand stick with matrix lines composed therein mounted on said bracket, guides on said bracket for supporting said receptacle slidable to and away from said mold, a knife for trimming the rear edge of the slug movable transversely of said bracket, a guide for said knife supported by said frame below said mouth-piece, said knife having its cutting edge lying externally of the front of said frame in the vertical plane tangent to said mouth-piece, a horizontal ejector blade for ejecting cast slugs out from the mold arranged below said knife, a support block for supporting said ejector blade at the front of the frame, said blade being slidable in said block and normally arranged in a retracted position behind said plane tangent to said mouth-piece, means for vertically displacing said bracket with said mold and said receptacle supported thereon between three operative positions, namely a lower position at which said mold is arranged in front of said ejector blade, an upper position at which said mold is arranged in front of said mouth-piece of the pot, and an intermediate position at which said mold is arranged in front of said knife, means for displacing said receptacle toward and away from the mold, said last mentioned means being controlled by said means for vertically displacing said bracket so as to maintain said receptacle far from said mold in a hand stick inserting and in a hand stick replacing position when said bracket is in its lower position, to bring said receptacle near the mold with the matrix lines closely adjacent the mold when said bracket is in its upper position and the mold is in front of said mouth-piece of the pot, and to hold said receptacle in an intermediate position in which the matrices are disengaged from the cast slug supported by the mold when the bracket is in its intermediate position in which the mold is in front of said knife, means for locking the mold and matrix lines against said mouth-piece of the metal pot, means for actuating said knife and means for actuating said ejector blade, a driving motor and individual transmissions between said motor and said means for displacing said bracket, for feeding molten metal from the pot to said mouth-piece, for locking the mold against the latter and actuating said knife and said ejector blade in proper timing to obtain automatic operation of the machine.

2. A machine as set forth in claim 1, wherein said bracket comprises a slide slidable in said vertical guide, a pair of lateral guideways spaced therebetween and arranged at right angles to said slide symmetrically with respect to the middle vertical plane of said mouth-piece, and a pair of ribs each depending from one of said guideways and fast with said slide, a bell-crank lever rockingly supported by said ribs and having two arms fork-shaped at their ends, one of said arms projecting between said guideways, the other arm extending towards said vertical guide, a roller engaged by the fork-shaped end of said other arm, a support for rotatably supporting said roller fast with said machine frame, the head for carrying the matrix lines being slidable in said lateral guideways, a pair of spaced guides in said head at the level of said lateral guideways and parallel with the latter, a rectangular frame slidable in said spaced guides, a pair of transverse abutments between said spaced guides for limiting the movements of said frame and said head, spring means interposed between said frame and the abutment arranged nearer said front of the machine frame, a transverse pin at the middle of said frame, said pin engaging the fork at the end of said bell-crank lever, said bell-crank lever being arranged and shaped to perform a rotation towards the machine frame during the upward movement of said bracket to displace said head supporting the matrix line towards the mold when said bracket goes over from its lower to its upper position.

3. A machine as set forth in claim 1, including a lever extending transversely of said middle vertical plane of the mouth-piece of the pot for supporting and guiding the knife for trimming the rear edge of the slug, a slide carrying said lever, a bar secured to the front of said machine frame arranged at right angles to said middle vertical plane and having a longitudinal groove with a widened bottom provided in its front surface, a back portion on said slide engaging said groove in said bar for sliding therein, said bar extending throughout the length of the mold and beyond at one side of the machine frame, said slide being normally situated laterally of the mold path, said lever being superimposed on said slide and rockingly secured thereto near the end of said slide which in the normal or rest position of the latter is situated nearer the mold path, the end of said lever adjacent the above mentioned end of said slide having the knife secured thereto in such a position that the cutting edge of the knife is forwardly offset from both said slide and said lever, spring means interposed between said slide and lever for rotating the latter and constantly urging the cutting edge towards its position in which it is forwardly offset from both slide and lever, pincers for engaging the slug after it has been ejected from the mold, said pincers being secured to the rear end of the slide and forwardly offset from the latter by an extent greater than the mold width and arranged below the slide at the level at which the horizontal middle plane of the mold lies when said bracket carrying the mold occupies its lower position, an abutment fixed to the machine frame being further provided for releasing the slug from said pincers near the end of the return stroke of said slide towards their rest position at which the cutting edge of the said knife is out of the mold path.

References Cited in the file of this patent

UNITED STATES PATENTS

| | | |
|---|---|---|
| 2,235,482 | Hilpman | Mar. 18, 1941 |
| 2,426,166 | Burt | Aug. 26, 1947 |
| 2,542,599 | Turner | Feb. 20, 1951 |